E. J. DICKEY.
MACHINE FOR WORKING BUTTER.
No. 9,838.  Patented July 12, 1853.
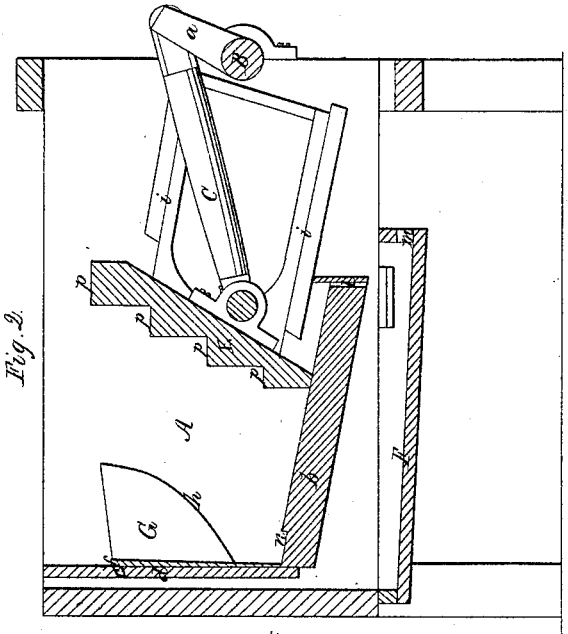
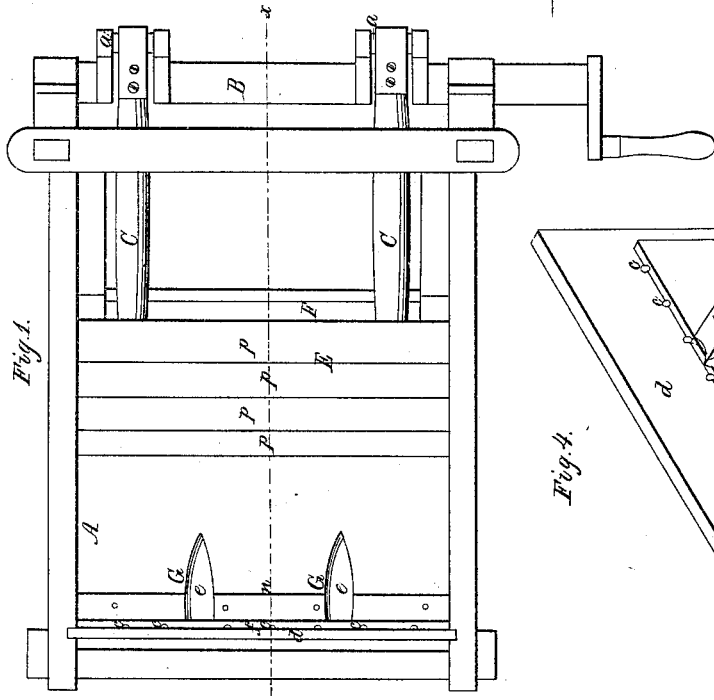
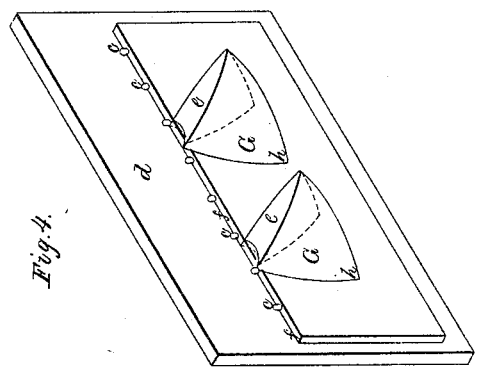

UNITED STATES PATENT OFFICE.

E. J. DICKEY, OF HOPEWELL COTTON WORKS, PENNSYLVANIA.

BUTTER-WORKER.

Specification of Letters Patent No. 9,838, dated July 12, 1853.

*To all whom it may concern:*

Be it known that I, E. J. DICKEY, of Hopewell Cotton Works, in the county of Chester and State of Pennsylvania, have invented a new and Improved Machine for Working Butter; and I do hereby declare that the following is a full and exact description thereof, reference being had to the accompanying drawings, making part of this specification, Figure 1 being a top view of the machine; Fig. 2, a vertical section thereof in the line *x x* of Fig. 1; Fig. 3, view of a part detached, and Fig. 4 a perspective view of a part detached.

Like letters designate corresponding parts in all the figures.

A rectangular box A, of a suitable size to contain the amount of butter which it may be required to subject to the operation of the machine at any one time, is constructed with one end and the top open, substantially as shown in the drawings. The bottom *b*, is somewhat inclined toward the open end of the box; and a second bottom, or trough F, is situated a little distance below it, for the purpose of receiving the buttermilk, as hereinafter described. A sliding partition *d*, is fitted across and near the closed end of the box, and is made removable at pleasure, for greater convenience in cleaning the machine. Not far from the top of said partition is a projecting groove, or channel, *f*, extending horizontally along its front side; from which several small orifices *c, c, c*, &c., lead back through the partition, so as to conduct away the buttermilk flowing along said channel, into the receiving trough F. On the front side of said partition is situated a series of cutters G, G, &c., formed and arranged substantially as shown in the drawings; the edge *h*, of each being sharp, and the upper surface *e*, being grooved and a little inclined downward toward the partition, so that any fluid, passing along said grooved surface, will flow off into the channel *f*, and be discharged. Each knife is attached to the partition by a pivot near its upper edge, (as shown at *g*, Fig. 3,) on which pivot it may be made to vibrate, in order to adjust it perpendicularly, or at any other angle. Any convenient number of cutters may be placed side by side.

Toward the open end of the box, is situated a presser, or piston, E, which fits closely between the sides of the box, and is caused to slide therein upon the bottom *b*, a suitable distance, by means of levers C, C, and cranks *a, a*, which are operated by manual or other power applied to the shaft B. The piston is kept in place by guides *i, i*, and is placed in an oblique position, as shown in Figs. 1 and 2. I also usually form its inner side into a series of steps *p, p*, &c., as shown in the drawings. When at the end of its inward stroke, it reaches nearly to the knives G, G, &c., and a notch, or depression *n*, formed in the bottom *b*.

The butter to be worked is placed in the box between the partition *d*, and the reciprocating presser E, which is then put in motion. Upon being pressed up by said presser, the butter is divided by the cutters, or knives, G, G, &c., and the buttermilk contained therein near said cutters, is forced up along their surfaces by the pressure, and flowing into the grooves *e, e*, &c., is discharged into the trough F, whence it is caught through the orifice *m*, into a suitable receiving vessel. The butter is prevented from following the presser, as it recedes in its motion, by the recess, or depression, *n*, and being caused to overhang by the shape and inclination of the said presser, it falls over, and thus presents a new surface to be acted on, in the next return of the presser. The knives G, G, &c., may be inclined all in one direction, (as shown by black lines, Fig. 4,) whereby the butter will be gradually worked toward one side of the box; then, by inclining the knives in the other direction (as shown by red lines, Fig. 4,) the butter will be moved back to the other side; and thus the inclination of the knives may be reversed as many times as desired. The butter is in this manner worked till it becomes a homogeneous mass, and the buttermilk is entirely extracted therefrom, and is discharged partly by the channel *f*, as before described, partly by the recess *n*, whence small orifices through the bottom *b*, drains it off; and a portion runs down said inclined bottom and is discharged through the orifice *l*, into the trough F.

My above described machine, for working butter, may also be applied to cutting cheese curd and other similar uses.

Having thus fully described my improved butter worker, what I claim therein as new and desire to secure by Letters Patent is,

1. The adjustable knives G, G, &c., arranged within the box of the said machine, and operating in conjunction with the reciprocating presser substantially in the manner and for the purpose herein set forth.

2. I also claim the recess, or depression, $n$, in the bottom of the box, for the purpose of preventing the butter's adhering to the presser and being drawn back during its receding motion, substantially as herein described.

The above specification of my improved machine for working butter, signed by me this 24th day of December, 1852.

E. J. DICKEY.

Witnesses:
B. F. KENDALL,
J. S. BROWN.